United States Patent [19]

Hodgkinson

[11] Patent Number: 4,997,145
[45] Date of Patent: Mar. 5, 1991

[54] ENGINE MOUNT INCLUDING ENGINE MOUNT FAILURE INDICATOR

[75] Inventor: Carl Hodgkinson, Derby, England

[73] Assignee: Rolls-Royce plc, London, England

[21] Appl. No.: 425,238

[22] Filed: Oct. 23, 1989

[30] Foreign Application Priority Data

Nov. 12, 1988 [GB] United Kingdom ............... 8826514

[51] Int. Cl.⁵ .......................................... B64D 27/00
[52] U.S. Cl. ....................................... 244/54; 248/554
[58] Field of Search ............... 244/54; 248/554, 557, 248/556; 180/300

[56] References Cited

U.S. PATENT DOCUMENTS

| | | | |
|---|---|---|---|
| 4,022,018 | 5/1977 | Tuten et al. | 248/554 |
| 4,065,077 | 12/1977 | Brooks | 244/54 |
| 4,381,043 | 4/1983 | Fukushima | 244/54 |
| 4,500,054 | 2/1985 | Osborn | 244/54 |
| 4,717,094 | 1/1988 | Chee | 244/54 |

Primary Examiner—Joseph F. Peters, Jr.
Assistant Examiner—Christopher P. Ellis
Attorney, Agent, or Firm—Cushman, Darby & Cushman

[57] ABSTRACT

When a breakage occurs to the connecting links which connect a gas turbine engine to aircraft structure, the engine drops onto a fail/safe mounting. The drop is minimal in magnitude and the invention provides a visual means for appreciating that the drop and therefore the breakage, has occurred. Relative movement between engine and airframe frees a pop up member and enables it to project beyond the engine envelope, for observation by inspection.

6 Claims, 3 Drawing Sheets

ENGINE MOUNT INCLUDING ENGINE MOUNT FAILURE INDICATOR

BACKGROUND OF THE INVENTION

1. Field of the Invention

This invention is concerned with the mounting of a gas turbine engine on aircraft structure.

2. Description of the Prior Art

It is common practice to mount a gas turbine engine on aircraft structure via an arrangement of links, and pegs in cooperating holes.

The conventional practice involves providing a peg which resides in a hole in the engine structure. The diameter of the hole is larger than the diameter of the peg which resides therein. The arrangement is such that, in the event of the mounting failing and abnormal movement between engine and aircraft occurring, the extent of the relative movement between the engine and aircraft is arrested by eccentric engagement of the peg with a side of the hole in the structure. The engine is thus retained in situ, if not in proper alignments, until a landing is achieved.

The radial clearance between the peg and hole may be in the order of five millimetres (about 0.200 inches). This, relative to the overall dimensions of the engine, is extremely small. Unless the displacing of the engine generates noticeable side effects e.g. excessive vibration, it may well go unnoticed.

This invention provides an improved engine mounting means.

Summary of the Invebtion

According to the present invention, an indicator means is provided for indicating abnormal relative movement between a gas turbine engine and associated aircraft structure. This indicator means includes a member slidably mounted in a housing which is adapted for fixing to a said aircraft structure, movable means for engaging said member so as to retain it in said housing, means for moving said movable means to disengage it from said member in the event of occurrence of abnormal relative movement between engine and aircraft structure, said means for moving said movable means being connectable thereto and to the aircraft structure and said engine so as to generate the force necessary from said abnormal movement to move the movable means out of engagement with the member, and means for thereafter urging said member to a position wherein an end thereof is visible externally of the engine when said engine is in situ on said aircraft structure.

BRIEF DESCRIPTION OF THE DRAWINGS

The invention will now be described, by way of example and with reference to the accompanying drawings in which.

DESCRIPTION OF THE PREFERRED EMBODIMENTS

Figure 1:
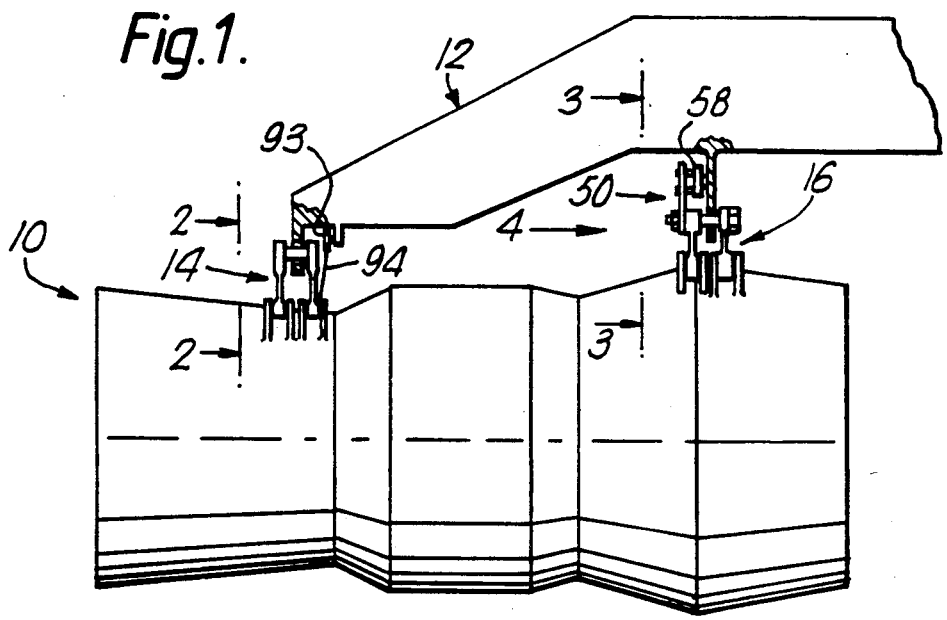
FIG. 1 is a diagrammatic view of a gas turbine engine which incorporates an embodiment of the present invention.

Referring to FIG. 1 a gas turbine engine 10 is suspended from a pylon 12 which is part of the aircraft structure by a plurality of links (not shown in FIG. 1) at positions fore and aft of the engine mid portion. Further links 14 and 16 are shown, but these are not utilized as support means unless one or more of the first mentioned links (not shown in FIG. 1) breaks. This will be enlarged upon later in this specification.

Figure 2:
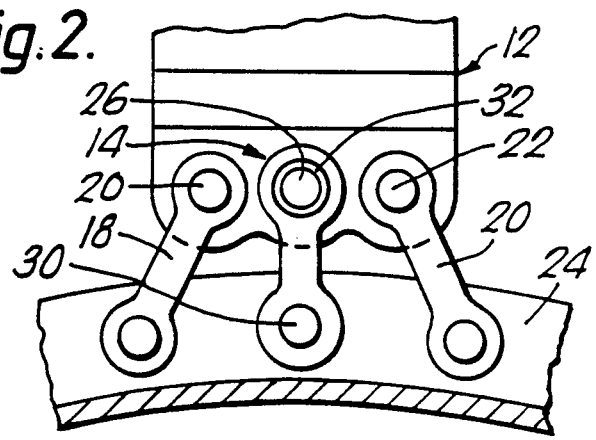
FIG. 2 is a part view on the line 2—2 of FIG. 1 and illustrates engine front mounting links.

Referring now to FIG. 2 the main supporting links at the fore position on the engine 10 are numbered 18 and 19 and are arranged so as to support the vertical loads exerted by the engine 10, in known manner. The connection is made between respective points 20, 22 on the pylon 12 and flanges 24 on the engine 10.

The linkage 14 is a fail/safe linkage i.e. a pin 26 projects through and beyond both ends of a clearance hole 28 in the pylon and receives ends of a pair of links 14 (FIG. 1) only one of which is shown in FIG. 2. The other ends of the links 14 are rotatably located on the flanges 24 by pins 30.

The clearance referred to hereinbefore is annular and designated 32. If either of the links 18 or 20 breaks, the engine 10 will drop until the upper ends of the links 14 engage the pin 26, which then supports the engine 10 until such time as the associated aircraft can land. In the present example, the drop is about five millimeters.

Figure 3:
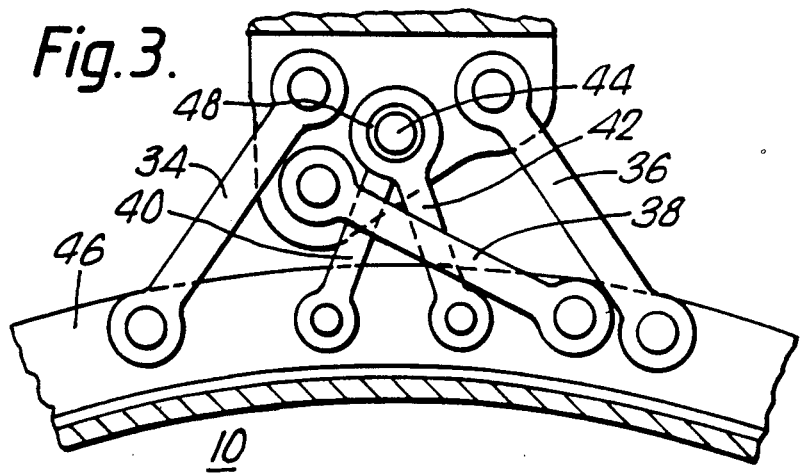
FIG. 3 is a part view on line 3—3 of FIG. 1 and illustrates engine rear mounting links.

Referring now to FIG. 3, the aft mounting structure has vertical load supporting links 34 and 36, and a torque link 38 which resists any effort by the engine to rotate bodily about its axis.

Fail/safe links 40 and 42 are provided and are a clearance fit on a pin 44 in the pylon 12 and a rotary fit to a flange 46 on the engine 10. Again the clearance 48 is annular and of a magnitude of about five millimeters (approximately 0.200 inches)

Figure 4:
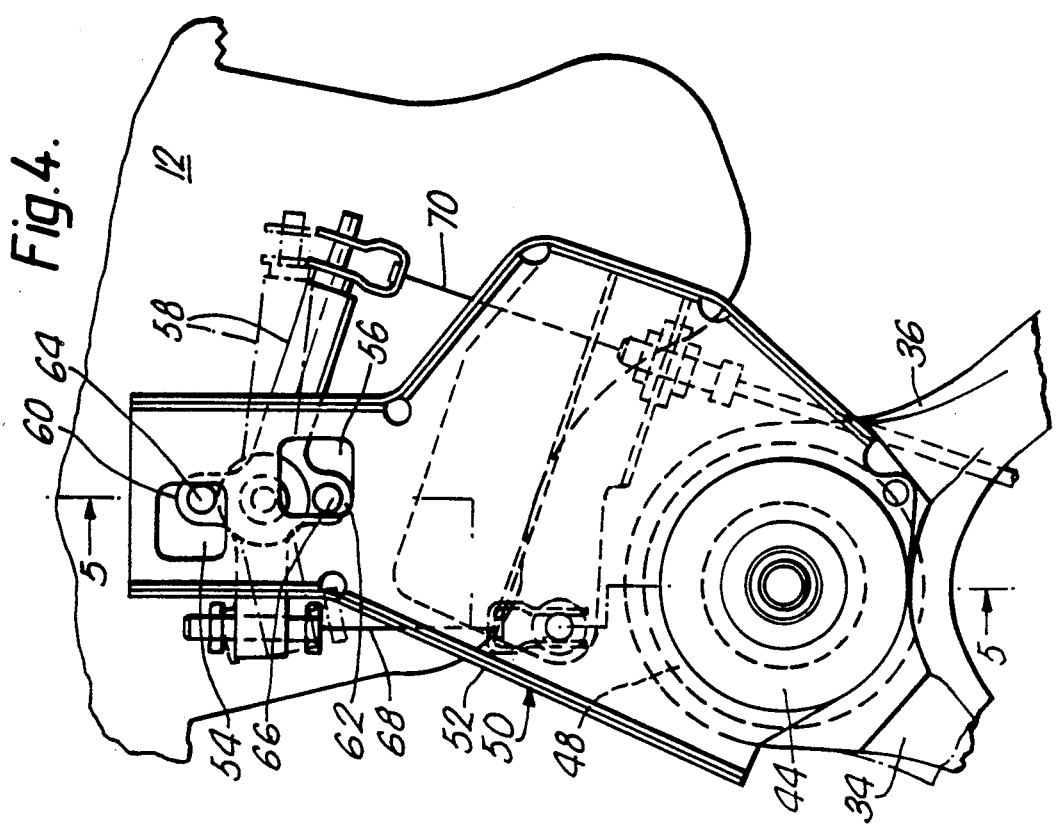
FIG. 4 is a view in the direction of arrow 4 in FIG. 1.

It will be appreciated by the man skilled in the art that the size of the gas turbine engine of the kind which powers an aircraft is great relative to the magnitude of drop of that engine onto its fail/safe mounting. Consequently, the failure condition is not visually observable without panels being removed to expose the mounting structure. Thus visual means are provided which obviate the necessity of panel removal, and will now be described with reference to FIGS. 4 to 6, FIG. 4 being referred to first.

The pin 44 has a bracket 50 fastened to its extremity. The mode of fastening is seen more clearly in FIG. 5. The bracket 50 has a peripheral flange 52 for stiffening purposes.

The upper end portion of the bracket 50 has a pair of rectangular cut outs 54 and 56 formed therein.

Figure 5:
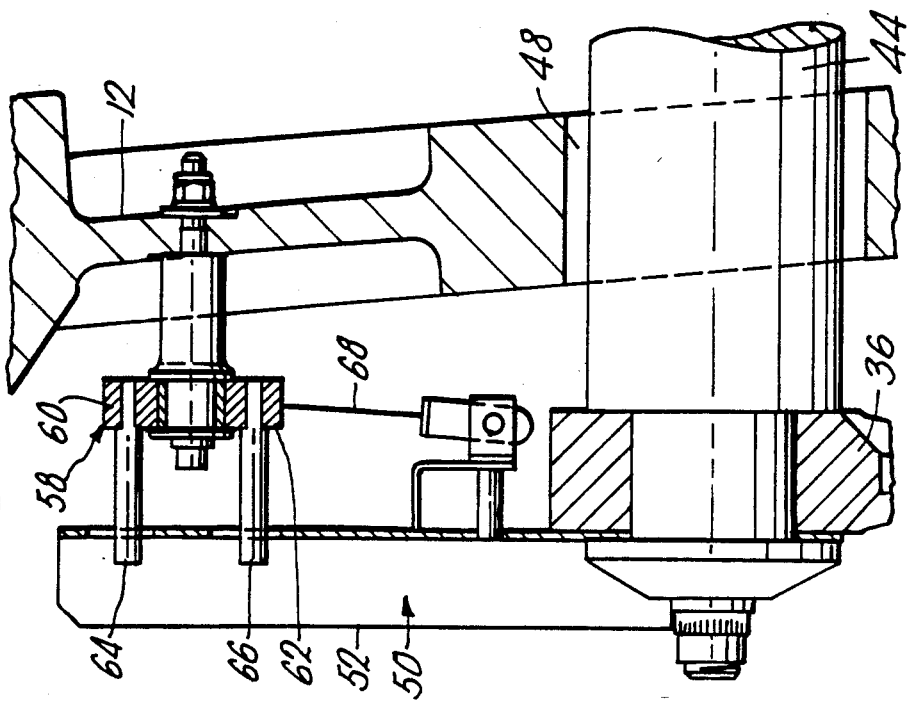
FIG. 5 is a view on line 5—5 of FIG. 4
Figure 6:
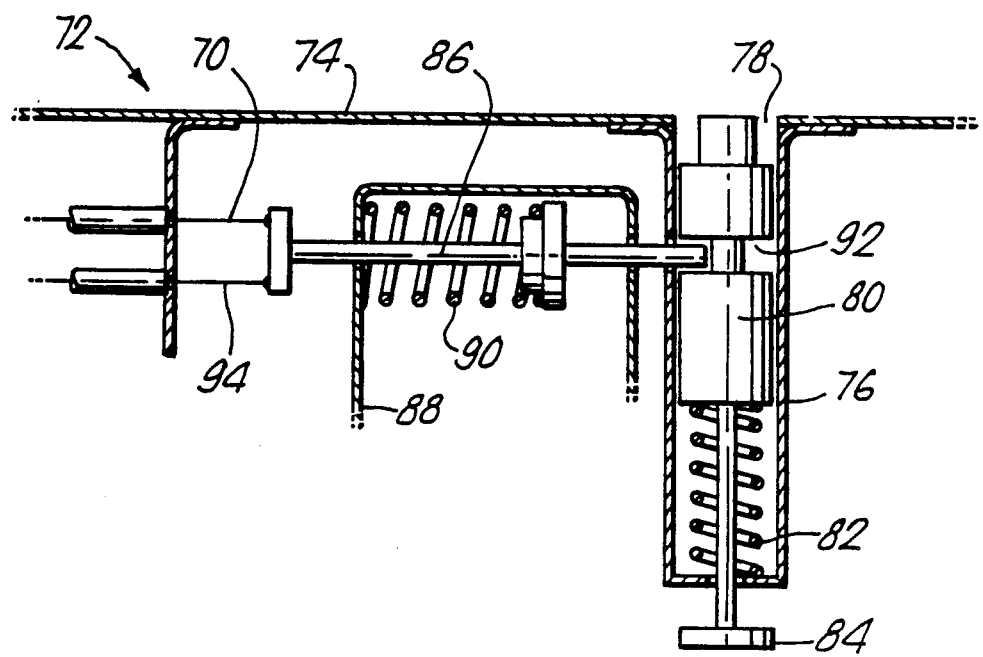
FIG. 6 is a cross sectional view of a portion of the apparatus in accordance with the present invention.

A lever 58 is pivotally connected intermediate its ends to that part of the pylon 12 which has the clearance hole 48 therein. Again the pivot connection of the lever 58 is best seen in FIG. 5. The lever 58 has opposed lobes 60 and 62 formed laterally of its pivot axis and each lobe has one of two pins 64 and 66 fixed to it.

The free extremities of the pins 64 and 66 project through respective cut outs 54 and 56. In so doing, one side of pin 64 engages the right hand side of the cut out 54 as viewed in FIG. 4, and the opposite side of pin 66 engages the left hand side of the cut out 56.

One end of the lever 58 is connected to the bracket 50, and therefore, to the engine 10, via a wire 68. The other end of the lever 58 is connected to the pylon 12 via a wire 70 and a device 72 (FIG. 6) which will be described hereinafter with reference to FIG. 6.

The device 72 is an assembly which includes wall structure 74. Wall structure 74 is part of a streamlined cowl (not shown in toto) which encloses pylon 12.

The way such a streamlined cowl encloses such a pylon is known in the engine mounting art.

A cylinder 76 is fixed by an end to the wall structure 74 with its bore in alignment with an aperture 78 therein. The cylinder 76 contains a piston 80 which is urged towards the aperture 78 by a compression spring 82. A stop 84 is provided on that end of the piston 80 remote from the wall structure 74, which prevents ejection of the piston 80 from the cylinder 76.

A further piston 86 is slidably mounted between fixed sub-wall structure 88 and is urged by a compression spring 90 into engagement with a groove 92 in the piston 80 via an end.

The other end of the piston 86 extends externally of the sub wall structure 88 and is connected to the end of the wire 70.

During operation of the engine 10, if one or both of the links 34, 36 (FIG. 4) should break, the engine 10 will drop and so will the pin 44, onto the side of the bore in the pylon 12. This will result in the wire 68 being pulled downwards, which in turn will pivot the lever 58 counter-clockwise as viewed in FIG. 4, to the position shown in chain dotted lines. The wire 70 will thus be pulled upwards and this movement is transmitted thereby, to the piston 86 (FIG. 6) which will withdraw from the groove 92 in the piston 80. The spring 82 will then urge the piston 80 upwards so that its end protrudes beyond the wall structure (74) and thus provides a (visual indication) that the engine has dropped and therefore, the mounting is damaged.

Should the torque link 38 break, the engine 10 will develop a turning movement about its axis. In this case, the bracket 50 will move bodily in an arcuate path in the same direction of rotation. Depending on that direction of rotation, a side of one or other of the cut outs 54, 56 will exert a force on its respective pin 64 or 66 and cause the lever 58 to rotate in an anti-clockwise direction. The arrangement is such that the lever 58 always rotates in the said counter-clockwise direction as viewed in FIG. 4. It follows that the wire 70 will always be pulled and that will cause the pistons 86 and 80 to be moved as described hereinbefore. If however, the connections of the wires 68 and 70 were reversed, then the bracket would have to be adapted so that those edges of the windows 54 and 56 which are opposite the edges shown engaging the pins 64 and 66, will engage the pins 64 and 66.

Referring back to FIGS. 1 and 2, since this mounting supports vertical loads, no torque link is included. It follows that the bracket 50 and associated lever 58 which are utilized on the rear mounting may be dispensed with. Only a single wire 94 (FIG. 1) need have one end connected to the engine 10, have an intermediate portion looped over a pulley 93 fixed to the pylon 12 and the other end fixed to the device shown in FIG. 6 which is also fixed to the aircraft structure. Alternatively, the lever 58 could be substituted for the pulley 93. In this case, suitable proportioning of the lever 58 each side of its pivot point would enable a desired magnitude of wire movement at one end of the lever 58 relative to a given magnitude of movement of the wire at the other end thereof.

I claim:

1. An engine mount failure indicator for indicating abnormal relative movement between a gas turbine engine and an associated aircraft structure, comprising:
   a member slidably mounted in a housing which is adapted for fixing to said aircraft structure;
   a movable means for engaging said member so as to retain it in said housing;
   means for moving said movable means to disengage it from said member in the event of occurrence of said relative abnormal movement between the engine and the aircraft structure, wherein said means for moving said movable means is connectable to said aircraft structure and to said engine so as to generate from said abnormal movement the force necessary to move the movable means out of engagement with the member; and
   means for thereafter urging said member to a position wherein an end thereof is visible externally of a said engine when said engine is in situ on said aircraft structure.

2. The engine mount failure indicator of claim 1 wherein the means for moving said movable means comprises a wire which in situ has one end fastened to said engine and its other end fastened to said means and an intermediate portion supported by said associated aircraft structure, said means for moving said movable means being supported in a manner which enables a reciprocatory movement of the wire ends in opposite directions on occurrence of said relative abnormal movement.

3. The engine mount failure indicator of claim 2 including a pulley which in situ is attachable for free rotation to said associated aircraft structure such that said pulley supports said intermediate portion of said wire so as to enable said reciprocatory movement thereof.

4. The engine mount failure indicator of claim 2 wherein the effective intermediate portion of said wire comprises a lever having ends and being pivotally connectable intermediate said ends to said aircraft structure and connected to said wire by said ends.

5. The engine mount failure indicator of claim 4 wherein said lever has a pair of lateral extensions about a pivot axis, each said extension including a pin which projects therefrom in a direction parallel with the pivot axis of said lever, and wherein a bracket is provided and adapted for fixing to said engine, said bracket including a pair of rectangular cut outs, the arrangement being such that when said bracket and said lever are in situ, each pin projects through a respective cut out and in so doing engages a respective side thereof, one said engaged side being of opposite hand to the other said engaged side.

6. A gas turbine engine disposed on said aircraft structure and including said engine mount failure indicator of claim 1.

* * * * *